Nov. 1, 1932.  W. C. MORAN  1,885,855

TESTING MACHINE

Filed Aug. 13, 1931  2 Sheets-Sheet 1

Inventor
William C. Moran,
Attorney

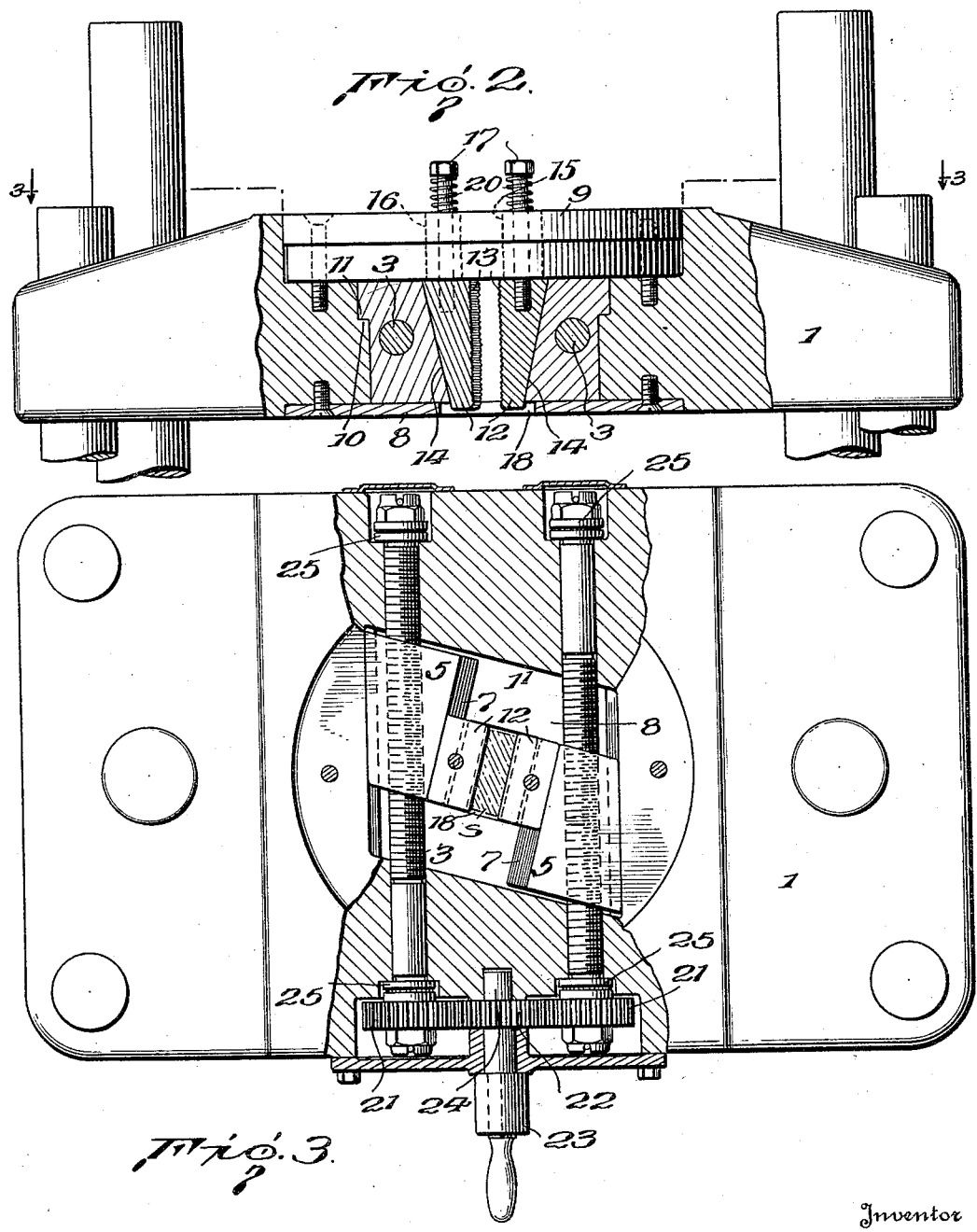

Patented Nov. 1, 1932

1,885,855

UNITED STATES PATENT OFFICE

WILLIAM C. MORAN, OF LAUREL SPRINGS, NEW JERSEY, ASSIGNOR TO RIEHLE BROS. TESTING MACHINE COMPANY, OF PHILADELPHIA, PENNSYLVANIA, A CORPORATION OF PENNSYLVANIA

TESTING MACHINE

Application filed August 13, 1931. Serial No. 556,899.

This invention relates to grips or tension shackles for testing machines and to means for actuating the same, and particularly to wedge grips or shackles such as are used in making tensile tests.

It is common practice in testing machines for making tensile tests, that is, tests in which the specimen to be tested is subjected to a strain which tends to elongate it, to grip opposite ends of the specimen in different parts of the machine which parts are then drawn or forced apart. In such testing machines the quality of the specimen is determined by the load necessary to rupture the specimen, or to produce a definite elongation thereof, or the elongation produced by a predetermined load.

As the test-bars are frequently subjected to enormous loads and as any slippage of the test-bar, or specimen in the grip or shackle will prevent an accurate test being made it is very essential that the structure of the grip or shackle shall be such that the test-bar will be held against slippage under any load to which the bar may be subjected.

One method which has been adopted for securely holding the test specimens in the heads of the testing machine involves the use of pairs of wedges located in wedge-shaped openings in the heads of the machine which are to be drawn or forced apart. These wedge grips ordinarily have serrated or roughened straight faces which oppose each other and outwardly diverging inclined edges which bear against correspondingly inclined edges in the heads of the testing machine. When a test is to be made the specimen to be tested is placed between the serrated or roughened straight faces of the wedges of the upper and lower heads of the machine and the wedges initially tightened thereagainst. When the load is then applied to separate the heads the wedge grips slip inwardly within the openings in the heads, and the inclined edges of the grips cooperating with the inclined edges of the openings in the heads cause the specimen to be gripped between the grips or shackles with an increasing pressure until the pressure becomes so great that no further movement of the grips within the heads occurs.

If the best results are to be obtained when wedge grips or shackles are used the wedge grips should bear for their full length against the inclined edges in the openings of the heads and the specimen should bear against the wedge grips for the full length thereof for otherwise there is a tendency, when the load is applied, for the specimen to be crushed and a force applied to the head which may split it.

As the openings in the heads of the testing machine always remain the same size it is obvious that any one set of wedge grips can only be used with a test-specimen of a definite thickness if the specimen and wedge grips are to be properly positioned within the heads of the machine. Therefore, it is customary to provide the machines with a plurality of wedge grips of different sizes so that specimens of various thicknesses may be properly gripped within the head, and also to use liners in the head openings to reduce the effective sizes thereof.

It is also essential if accurate tests are to be obtained that the grips shall always remain in the same relative position and in alignment either vertically or horizontally depending upon whether the machine is a vertical or horizontal one. If the grips are not maintained in this relative position the specimen will not be evenly gripped but a greater pressure will be exerted on one side than on the other.

While wedge grips or shackles as described above have been generally satisfactory, difficulty has been experienced, particularly in the vertical machines, in getting the specimen and grips properly positioned in the head. It is, of course, necessary to first secure the specimen in one head and then in the other and the up and down movement necessary to cause the grips to obtain their final hold on the specimen in one head necessarily tends to release the hold of the grips against the specimen in the other head. The use of liners in order to insure that the wedge grips bear their full length against the inclined opening in the head is also a nuisance and a bother to the operator.

The present invention overcomes the existing disadvantages accompanying the use of wedge grips and provides a compact arrangement whereby the use of all liners is eliminated and the grips in each head are absolutely centralized at the beginning of a test. The present invention also particularly overcomes the tendency of one set of grips to become released from the specimen while the other set is being adjusted by causing the grips to be brought into gripping position through a horizontal movement rather than through a vertical movement.

More specifically the invention comprises a testing machine in which the upper and lower heads have wedge blocks threadedly mounted on a pair of parallel screws, the threads of which extend in opposite directions so that when they are rotated the wedge blocks which are held against rotation, will simultaneously move along the screws either toward or away from each other, depending upon the direction of rotation of the screws. These wedge blocks are provided with outwardly diverging inclined faces similar to the inclined faces in the heads of existing machines and these inclined faces are adapted to bear against correspondingly inclined faces on wedge grips. The wedge grips are carried and supported by a holding plate in such manner that they may move towards and away from each other to grip or release a test specimen, and to cause the wedge grips to move towards each other to initially grip the specimen the inclined faces of the wedge blocks against which the wedge grips bear are also inclined horizontally so that when they are moved towards each other the inclined faces, bearing against the wedge blocks will force them together. The wedge grips are also carried by the supporting plate so that they may have a limited vertical movement along the inclined faces of the wedge blocks as is customary in the use of wedge grips to insure the gripping pressure against the specimen increasing as the load increases.

The invention is further illustrated in the accompanying drawings and description but it is to be understood that this further illustration and description is an exemplification of the invention and the same is not limited thereto except as set forth in the appended claims.

In the drawings Fig. 1 is a view of the upper and lower heads of a vertical testing machine with a portion of a conventional type of testing machine more or less diagrammatically shown.

Fig. 2 is a vertical sectional view through the upper head of the machine.

Fig. 3 is a horizontal sectional view on line 3—3 of Fig. 2, and

Figure 1:
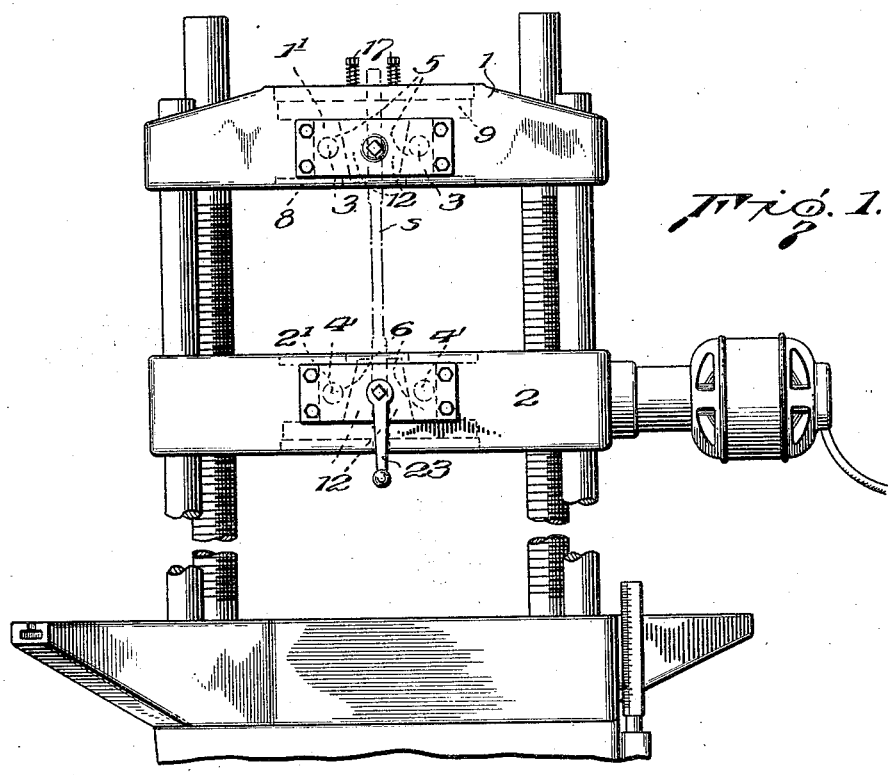
Figure 4:
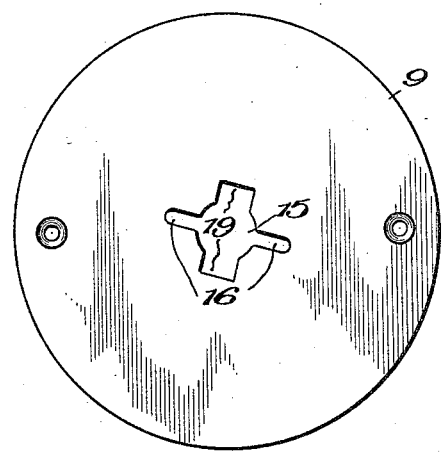
Fig. 4 is a plan view of the wedge-grip supporting plate.

In the drawings the head supporting portions of a conventional type of vertical testing machine for subjecting the test specimen to a strain which tends to elongate it are more or less diagrammatically shown. This testing machine has upper and lower heads 1 and 2 which may be moved toward or away from each other in a manner which is well understood and forms no part of the present invention.

The upper head 1 is provided with a pair of horizontally extending parallel screws 3 and the lower head is provided with a pair of similar screws 4 which are in vertical alignment with the screws 3 of the upper head.

The upper screws 3 have threadedly mounted thereon a pair of wedge blocks 5 and a similar pair of wedge blocks 6 are threadedly mounted on the screws 4 of the lower head. Each of the wedge blocks is provided with one face 7 which is inclined both vertically and horizontally and the wedge blocks are arranged on the screws so that the respectively horizontally inclined faces of the blocks of each pair are parallel as shown in Fig. 3 and also so that the vertically inclined faces of the pairs of wedge blocks converge inwardly as shown in Fig. 2.

The screws 3 and 4 of each pair are oppositely threaded, that is, one screw of each pair has a right hand thread while the other screw of that pair has a left hand thread, so that when the screws are rotated by means hereinafter described the wedge blocks will be moved simultaneously towards or away from each other, depending upon which way the screws are rotated. This movement of the wedge blocks along the screws taking place within and being limited by the openings 1' and 2' in the upper and lower heads 1 and 2.

The wedge blocks are guided in their movement along the screws and held against rotation thereabout by the side edges of the openings 1' and 2' and by means of inner plates 8 and outer grip-supporting plates 9, each of which is bolted or otherwise secured to the upper and lower heads 1 and 2 of the machine. The sides of the openings 1' and 2' of the heads 1 and 2 are each provided with a ledge or shoulder 10 on which an overhanging portion 11 of each of the wedge blocks bears. These ledges or shoulders aid the screws in supporting the wedge blocks against the heavy forces tending to move them towards each other when the specimen is stressed.

The supporting plate 9 of each head of the machine carries a pair of wedge grips or shackles 12. These wedge grips have opposed straight faces 13 which are serrated or roughened to better grip the specimen S which is held between them. These faces are shown in the drawings as lying entirely in one plane, as they would be for gripping flat test specimens, but if they were to grip round test specimens they would be provided with V-shaped grooves and the serrations would then be formed in the sides defining the groove. Each of the wedge grips are also provided with vertically inclined sides 14 which correspond to and bear against the inclined faces 7 of the wedge blocks.

The wedge grips 12 are carried by the grip supporting plates 9 so that they may move towards or away from each other and also vertically along the inclined edges 7 of the wedge blocks. To permit such movement and to permit the ready assembly of the wedge grips and their changing when necessary the grip supporting plates are each provided with a central opening 15 which has relatively narrow slots 16 extending therefrom. Each of the wedge grips has secured thereto a bolt 17 which passes outwardly through one of the slots 16 in the corresponding supporting plate 9 and acts as a guide for the wedge grip carried thereby. This not only provides a very effective manner for supporting and guiding the wedge grips but also permits the ready changing of the grips for testing specimens of different thicknesses or contour, it being necessary only to remove the bolts 17 and permit the grips to drop through an opening 18 in the plate 8. The openings 15 and 18 in the plates 9 and 8 also permit the test specimen to extend through the heads and to better facilitate this the opening 15 in the plate is provided with diametrically opposite offset portions 19 which extend parallel with the gripping faces of the wedge grips.

The weight of the upper grips is counterbalanced by springs 20 located between the head of the bolts 17 and the plates 9. No springs are needed for the lower wedge grips because the entire apparatus of the lower head is in inverted position from the apparatus of the upper head and the wedge grips are supported by resting upon the lower supporting plate 9.

To cause rotation of the screws 3 and 4 and a movement of wedge blocks therealong to force the wedge grips against the specimen the front end of each screw is provided with a squared portion on which is mounted a pinion 21. These pinions mesh with opposite sides of a common pinion 22 which is driven by a hand crank 23 mounted upon the shaft 24 which carries the pinion 22. As the screws of each pair are oppositely threaded, turning the hand crank 23 causes the wedge blocks to be moved along the screws simultaneously towards or away from each other. If the crank is turned to the right in Fig. 3 the wedge blocks will be moved towards each other and such movement will cause their horizontally inclined edges 7 to gradually push the wedge grips 12 towards each other until the specimen S is properly gripped, such movement of the wedge grips toward each other being permitted as already stated by the slots 16 in the supporting plates 9.

Each end of each of the screws is rotatively mounted and held in longitudinal position by suitable thrust bearings 25 which take the force resulting from the resistance of the wedge blocks to motion in either direction.

The faces 7 of the wedge blocks are shown as inclined approximately fifteen degrees to a line passing through the center of the machine from front to back, but obviously some other angle could be used, or the wedge grips could be placed so that their gripping faces would be parallel to such a center line.

In making tests with a machine equipped with gripping devices as herein described, the handcrank 23 is turned towards the left in Fig. 3 until there is sufficient space between the wedge grips 12 for the specimen. The specimen is then held between the grips of either the upper or lower head care being taken that the end of the specimen at least extends to the outer ends of the wedge grips, and the crank then turned in the opposite direction to cause the wedge blocks to be moved along the screws toward each other until the specimen is securely held between the wedge grips. The tightness with which any particular specimen is gripped will depend upon the material and the personal judgment of the operator. The same procedure is then repeated on the other head, except that it is no longer necessary to hold the specimen by hand while the wedge grips of that head are being forced into gripping engagement with the specimen.

Each end of the specimen having been securely fastened in the heads of the machine the load is applied to draw the heads apart and strain the specimen. As the load increases the wedge grips of the upper head slip downward in the upper wedge blocks and the lower wedge grips slip upwardly in the lower wedge blocks. As the inclined faces of both sets of the wedge blocks along which the wedge grips are moving diverge outwardly it will be obvious that the wedge grips will tighten on the specimen until no further motion of the wedge grips in the wedge blocks occurs. The slight amount of vertical motion of the wedge grips necessary to hold the specimen is readily obtained by compressing the springs 20.

As the motion necessary to cause the wedge grips to securely grip the specimen is applied horizontally instead of vertically the up and down movement heretofore necessary to cause the grips to obtain their final hold on the specimen, together with the resulting tendency of the first pair of wedges to release their hold while the second pair is being adjusted is eliminated.

When the testing machine is initially assembled it is adjusted so that the upper and lower wedge blocks are in exact vertical alignment. Thereafter the operator merely has to insert the test specimen as above described and the specimen will be evenly gripped on both sides and absolutely centralized.

I claim:

1. In a testing machine, means for gripping a specimen to be tested, and means having an inclined face for moving said gripping means transversely of the specimen to grip the same.

2. In a testing machine, wedge means for gripping a specimen to be tested, and means for moving said wedge means transversely of the specimen to initially grip the same.

3. In a testing machine, means for gripping a specimen to be tested, means having an inclined face for moving said gripping means transversely of the specimen to initially grip the same and means for causing said gripping means to grip the specimen tighter upon application of the load.

4. In a testing machine, wedge means for gripping a specimen to be tested and transversely movable means for engaging and moving said wedge means to cause the same to initially grip the specimen.

5. In a testing machine, wedge means for gripping a specimen to be tested, transversely movable means for engaging and moving said wedge means to cause the same to initially grip the specimen and means for causing said gripping means to grip the specimen tighter upon application of the load.

6. In a testing machine, means for gripping a specimen to be tested on opposite sides thereof, and transversely movable means having an inclined face for engaging the gripping means on opposite sides thereof and moving said gripping means transversely to cause the same to grip the specimen.

7. In a testing machine, means for gripping a specimen to be tested on opposite sides comprising wedge grips, wedge blocks having inclined faces engaging inclined faces on the wedge grips and means for moving said wedge blocks transversely to cause the wedge grips to grip the specimen.

8. In a testing machine having a pair of heads, at least one of which is movable, means for gripping a specimen to be tested on opposite sides comprising wedge grips, wedge blocks carried on one of said heads and supporting said wedge grips, said wedge blocks having inclined faces engaging inclined faces on the wedge grips and means for moving said wedge blocks transversely to cause the wedge grips to grip the specimen.

9. In a testing machine having a pair of heads, at least one of which is movable, means for gripping a specimen to be tested on opposite sides comprising wedge grips, wedge blocks carried by one of said heads, said wedge blocks having faces inclined in two directions, the wedge grips having faces engaging said inclined faces of the wedge blocks, and means for moving said wedge blocks to cause one angle of the faces thereof to force the wedge grips into initial gripping engagement with the specimen, the other angle of the faces of the wedge blocks causing the wedge grips to more tightly grip the specimen upon application of the load.

10. In a testing machine, a pair of wedge blocks movable transversely of the machine, said wedge blocks having faces inclined in two directions, means for gripping the specimen on opposite sides engaging the inclined faces of said wedge blocks and means for moving said wedge blocks transversely whereby one angle of the inclined faces will cause the gripping means to initially grip the specimen, the other angle of the inclined faces causing said gripping means to more tightly grip the specimen upon application of the load.

11. In a testing machine having a pair of heads, at least one of which is movable, a pair of rods carried by one of said heads, wedge blocks mounted upon said rods, means for gripping a specimen to be tested and means including said rods for moving said wedge blocks along said rods to cause the gripping means to grip the specimen.

12. In a testing machine having a pair of heads at least one of which is movable, a pair of substantially parallel rods carried by one of said heads and extending transversely to the direction of movement of the movable head, wedge blocks mounted upon said rods, means for gripping a specimen to be tested and means including said rods for moving said wedge blocks along said rods to cause the gripping means to grip the specimen.

13. In a testing machine having a pair of heads, at least one of which is movable, a pair of rods carried by one of said heads and extending transversely to the direction of movement of the movable head, wedge blocks mounted upon said rods, said wedge blocks having a face thereof inclined in two directions, wedge grips for gripping the specimen adapted to engage said inclined faces, and means including said rods for moving said wedge blocks along said rods so that one angle of said blocks will cause the wedge grips to be brought into gripping engagement with the specimen, the other angle of the inclined faces acting to cause the grips to more tightly grip the specimen upon application of the load.

14. In a testing machine having a pair of heads, at least one of which is movable, a rod carried by one of said heads and extending transversely to the direction of movement of the movable head, a wedge block mounted upon said rod, means for gripping a specimen to be tested adapted to be engaged by said block, and means including said rod for moving said wedge block along said rod to cause the gripping means to grip the specimen.

15. In a testing machine having a pair of heads, at least one of which is movable, a screw rotatably mounted in one of said heads but held against longitudinal movement and extending transversely to the direction of movement of the movable head, a wedge block threadedly mounted on said screw but held against rotation thereabout, means for gripping a specimen to be tested adapted to be engaged by said block, and means for rotating said screw to cause said wedge block to move therealong and cause the gripping means to grip the specimen.

16. In a testing machine having a pair of heads, at least one of which is movable, a screw rotatably mounted in one of said heads but held against longitudinal movement and extending transversely to the direction of movement of the movable head, a wedge block having one face inclined in two directions threadedly mounted on said screw but held against rotation thereabout, means for gripping a specimen adapted to be engaged by said inclined face of the wedge block, and means for rotating said screw to cause the wedge block to move therealong and one angle of the inclined face thereof to move the gripping means into initial gripping engagement with the specimen, the other angle of the inclined face of said block causing the gripping means to more tightly grip the specimen upon application of the load.

17. In a testing machine having a pair of heads, at least one of which is movable, a pair of substantially parallel screws rotatably mounted in one of said heads, but held against longitudinal movement and extending transversely to the direction of movement of the movable head, a wedge block threadedly mounted on each of said screws but held against rotation, means for gripping a specimen to be tested adapted to be engaged by said wedge blocks and means for rotating said screws to cause said wedge blocks to move along said screws and the gripping means to grip the specimen.

18. In a testing machine having a pair of heads, at least one of which is movable, a pair of substantially parallel screws rotatably mounted in one of said heads but held against longitudinal movement and extending transversely to the direction of movement of the movable head, a wedge block threadedly mounted on each of said screws but held against rotation, each of said wedge blocks having one face inclined in two directions, means for gripping a specimen adapted to be engaged by said inclined faces of the wedge blocks and means for rotating said screws to cause the wedge blocks to move along the screws and one angle of each of the inclined faces of the wedge blocks to move the gripping means into initial gripping engagement with the specimen, the other angle of the inclined faces of said blocks causing the gripping means to more tightly grip the specimen upon application of the load.

19. In a testing machine having a pair of heads, at least one of which is movable, a screw rotatably mounted in one of said heads but held against longitudinal movement and extending transversely to the direction of movement of the movable head, a wedge block threadedly mounted on said screw but held against rotation thereabout, a supporting plate, means for gripping a specimen to be tested supported by said supporting plate and adapted to be engaged by said wedge block and means for rotating said screw to cause said wedge block to move therealong and cause the gripping means to grip the specimen.

20. In a testing machine having a pair of heads, at least one of which is movable, a screw rotatably mounted in one of said heads but held against longitudinal movement and extending transversely to the direction of movement of the movable head, a wedge block having one face inclined in two directions threadedly mounted on said screw, but held against rotation thereabout, a supporting plate, means for gripping a specimen carried by said supporting plate and adapted to be engaged by said inclined face of the wedge block and means for rotating said screw to cause the wedge block to move therealong and one face of the inclined face thereof to move the gripping means into initial engagement with the specimen, the other angle of the inclined face of said block causing the gripping means to more tightly grip the specimen upon application of the load.

21. In a testing machine having a pair of heads, at least one of which is movable, a screw rotatably mounted in one of said heads but held against longitudinal movement and extending transversely to the direction of movement of the movable head, a wedge block threadedly mounted on said screw but held against rotation thereabout, a supporting plate having a slot therein, wedge grips for gripping a specimen to be tested adapted to be engaged by said block, said wedge grips being supported by said supporting plate and guided in their movement by an extension operating in the slot in the supporting plate and means for rotating said screw to cause said wedge block to move therealong and cause the wedge grips to grip the specimen.

22. In a testing machine having a pair of heads, at least one of which is movable, a pair of substantially parallel screws rotatably mounted on one of said heads but held against longitudinal movement and extending transversely to the direction of movement of the movable head, a wedge block having one face inclined in two directions threadedly mounted on each of said screws, but held against rotation, a supporting plate having slots therein, wedge grips for gripping a specimen to be tested, adapted to be engaged by said inclined face of the wedge block, each of said wedge grips being guided in their movement by an extension operating in the slots in said supporting plate and means for rotating said screws to cause the wedge blocks to move therealong and one angle of the inclined face of said blocks to move the wedge grips into initial gripping engagement with the specimen, the other angle of the inclined face of said blocks causing the wedge grips to more tightly grip the specimen upon application of the load.

23. In a testing machine having a pair of heads, at least one of which is movable, a pair of substantially parallel screws rotatably mounted on one of said heads, but held against longitudinal movement, and extending transversely to the direction of movement of the movable head, said screws being threaded in opposite directions, a wedge block threadedly mounted on each of said screws but held against rotation thereabout, means for gripping a specimen to be tested, adapted to be engaged by said wedge blocks, means for rotating said screws comprising a driving pinion and a pinion on each of said screws, the pinions on said screws engaging opposite sides of the driving pinion whereby a rotation of the driving pinion in one direction causes a rotation of the screws in opposite directions, means for actuating said driving pinion to rotate said screws and thereby cause the wedge blocks to move toward each other and force the gripping means into gripping engagement with the specimen.

24. In a testing machine having a pair of heads, at least one of which is movable, a pair of substantially parallel screws rotatably mounted in one of said heads, but held against longitudinal movement and extending transversely to the direction of the movement of the movable head, said screws being threaded in opposite directions, a wedge block having one face inclined in two directions threadedly mounted upon each of said screws, but held against rotation, means for gripping a specimen adapted to be engaged by said inclined face of the wedge block, means for rotating said screws comprising a driving pinion and a pinion mounted on each of said screws, the pinions of said screws engaging opposite sides of the driving pinion whereby rotation of the driving pinion in one direction causes a rotation of the screws in opposite directions, means for actuating said driving pinion whereby the screws are rotated and the wedge blocks moved therealong toward each other with one angle of the inclined faces engaging said gripping means to force the same into initial gripping engagement with the specimen, the other angle of the inclined face causing the gripping means to more tightly grip the specimen upon the application of the load.

25. In a testing machine having a pair of heads, at least one of which is movable, a screw rotatably mounted in one of said heads, but held against longitudinal movement and extending transversely to the direction of movement of the movable head, a wedge block threadedly mounted on said screw but held against rotation thereabout, a supporting plate having a slot therein, wedge grips for gripping a specimen to be tested adapted to be engaged by said block, said wedge grips each having a headed extension passing through and operating within one of the slots of said supporting plate, springs interposed between the heads of said extensions and the supporting plate to counterbalance the weight of said wedge grips and means for rotating said screw to cause said wedge block to move therealong and force the wedge grips into engagement with the specimen.

26. In a testing machine having a pair of heads, at least one of which is movable, a pair of substantially parallel screws rotatably mounted in one of said heads but held against longitudinal movement and extending transversely to the direction of movement of the movable head, a pair of plates secured to opposite sides of one of said heads, a wedge block threadedly mounted on each of said screws, said wedge blocks being held against rotation about said screws and guided in their movement along the same by said plates, means for gripping a specimen to be tested adapted to be engaged by said wedge blocks and means for rotating said screws to cause said wedge blocks to move therealong and cause the gripping means to grip the specimen.

27. In a testing machine having a pair of heads, at least one of which is movable, a pair of substantially parallel screws rotatably mounted in one of said heads, but held against longitudinal movement and extending transversely to the movement of the movable head, a pair of plates secured to opposite sides of said head, a wedge block having one face inclined in two directions threadedly mounted on each of said screws, said wedge blocks being held against rotation about said screws and guided in their movement therealong by said plates, the outer of said plates having a pair of slots, wedge grips for gripping a specimen to be tested adapted to be engaged by said inclined face of the wedge blocks, the said wedge grips having extensions passing through and operating within said slots, and means for rotating said screws to cause the wedge blocks to move therealong and one angle of the inclined faces thereof to move said wedge grips into initial gripping engagement with the specimen, the other angle of the inclined faces of said wedge blocks causing the wedge grips to more tightly grip the specimen upon application of the load.

28. In a testing machine having upper and lower heads, at least one of which is movable, a pair of substantially parallel screws rotatably mounted in each of said heads, but held against longitudinal movement and extending through said heads transversely to the direction of movement of the movable head, a pair of plates secured to the upper and lower sides of each of said heads, a wedge block threadedly mounted on each of said screws, said wedge blocks being held against rotation and guided in their movement along the screws by said plates, the outer plate of each head having a pair of slots, wedge grips for gripping a specimen to be tested, said wedge grips having extensions passing through the slots in the slotted plate for guiding said grips, the extensions of the wedge grips of the upper head being headed at their outer end, springs interposed between the heads of said extensions and the supporting plate for counter-balancing the weight of the upper wedge grips, and means for rotating said screws to cause the wedge blocks to move therealong and to force the wedge grips into gripping engagement with the specimen.

In testimony whereof I affix my signature.

WM. C. MORAN.